United States Patent [19]

Giraud et al.

[11] 4,204,113
[45] May 20, 1980

[54] SYSTEM FOR KEEPING ACCOUNT OF PREDETERMINED HOMOGENOUS UNITS

[76] Inventors: Georges Giraud; Jean H. Mollier, both of 20, rue Dieumegard, 93406 Saint-Ouen, France

[21] Appl. No.: 941,733

[22] Filed: Sep. 12, 1978

[30] Foreign Application Priority Data

Sep. 16, 1977 [FR] France ............................... 77 28049

[51] Int. Cl.$^2$ ...................... G06F 15/20; G06K 5/00; G06K 19/06
[52] U.S. Cl. .................................. 235/375; 235/380; 235/488
[58] Field of Search ............... 235/487, 488, 375, 380, 235/419; 340/149 A

[56] References Cited

U.S. PATENT DOCUMENTS

| | | | |
|---|---|---|---|
| 4,001,550 | 1/1977 | Schatz | 235/487 |
| 4,004,133 | 1/1977 | Hannon et al. | 235/487 |
| 4,007,355 | 2/1977 | Moreno | 235/487 |
| 4,092,524 | 5/1978 | Moreno | 235/487 |
| 4,105,156 | 8/1978 | Dethloff | 235/487 |

Primary Examiner—Daryl W. Cook

[57] ABSTRACT

A system for keeping account of predetermined homogeneous units by means of an article such as a card, carrying information which may be the amount of a credit balance, and an external device for operating on the information. In general, the balance on the card is initially validated. Thereafter, the balance is irrevocably drawn upon as desired until a zero balance is reached. In order to avoid a single large expenditure to validate the card, and at the same time to minimize the possibility of fraud, a memory in the card has a plurality of zones which are individually validatable. A separate validating field in the memory has validating bits corresponding to individual memory zones. The validity field is accessible by the external device only, and is protected by a coded key embodied in the card. To make the system usable for recording other than whole numbers of units, one of the zones may have a plurality of sub-zones. One of the sub-zones may be allocated to multiples or sub-multiples of individual units.

18 Claims, 9 Drawing Figures

SYSTEM FOR KEEPING ACCOUNT OF PREDETERMINED HOMOGENOUS UNITS

BACKGROUND OF THE INVENTION

The present invention relates to systems for keeping account of predetermined homogenous units by means of an article bearing information and an external device for imprinting and/or operating on the information. More particularly, the invention is an improvement to systems of the kind described in a commonly-assigned French patent application Ser. No. 77 09822, entitled SYSTEM FOR KEEPING ACCOUNT OF PREDETERMINED HOMOGENOUS UNITS, which was filed in France on Mar. 31, 1977, and in corresponding U.S. application Ser. No. 889,517.

Systems of this kind include a card-like article which carries an initial quantum or balance and which records amounts corresponding to services or goods received or supplied. There are also a device or machine capable of imprinting the initial balance on the article, a device capable of altering the available balance on the article by an amount corresponding to the required or received services or goods, the supply of which is validated by the imprinting device; and a connection system between the article and the external devices.

The object of such systems is to make it possible to create recording or transaction media capable of recording whole numbers of units. The media may be used to note and to keep a record of the data involved in the transaction or recordal which takes place.

The arrangement which is described in the aforementioned patent application includes in particular an information bearing article, formed by a card for example, on which is recorded, in coded language, a certain balance of services or goods to be supplied, in the form of a certain number of separate and equal units.

When a user obtains a card, the card contains in its memory a predetermined credit which can be drawn upon as the user wishes. Eventually the credit value decreases from its initial value to a value of zero.

To avoid fraud, the memory of the card cannot be re-used once the total credit available has been utilized. The card, once void, cannot be used again and must be surrendered by the user when he wishes to obtain a new card.

If the card is to allow a large number of services or goods to be obtained, the initial value imprinted on it may be very great, which means that the expenditure at the time of purchasing the card is considerable.

It therefore appears desirable, to make the card more economical and easier on the pocket, to provide for the possibility of its being validated in sections.

The present invention makes "replenishment" possible, while at the same time ensuring that the system is still very difficult to use fraudulently.

SUMMARY OF THE INVENTION

Briefly stated, and in accordance with one aspect, the invention is an improved arrangement for keeping account of predetermined homogenous units by means of an article bearing information and external devices for imprinting and/or operating on the information. The article has a memory, circuits for controlling the memory, and means to couple the article temporarily to the imprinting and/or operating devices which include means for reading data from or writing it into the memory. The memory of the article contains in coded form information on the use for which the article is intended, on the units which are used to keep account of the operations which are performed, and on the number of units available. The reading and writing devices include means to write in the memory of the article the number of units required or received by the holder of the article and/or to reduce the number of units available in the memory by the number of units received or required by the holder. The memory is divided into three parts: (1) a part in which is stored the serial number of the card and information on the units, (2) a part termed a validating field to which access is gained by means of a predetermined key which is embodied in the article and which is accessible solely to the devices for reading from and writing in the memory of the article, and (3) a part which is devoted to unit storage and which is split up into individually validatable zones.

With such an arrangement, one or more zones of the article can be validated and then, at a later stage, fresh zones can be validated until the total capacity of the memory of the article has been used up.

Since the possibility exists of validating other zones of the memory during the life of the article, it is therefore necessary to prevent the kind of attempted illicit use which would consist of trying to validate other zones of the memory without using the imprinting machines provided for this purpose. This is the purpose of the key embodied in the article.

BRIEF DESCRIPTION OF THE DRAWINGS

In order that the present invention may be more readily understood, an embodiment thereof will now be described by way of example and with reference to the accompanying drawings, in which.

DETAILED DESCRIPTION OF THE DRAWINGS

Figures 1, 3:
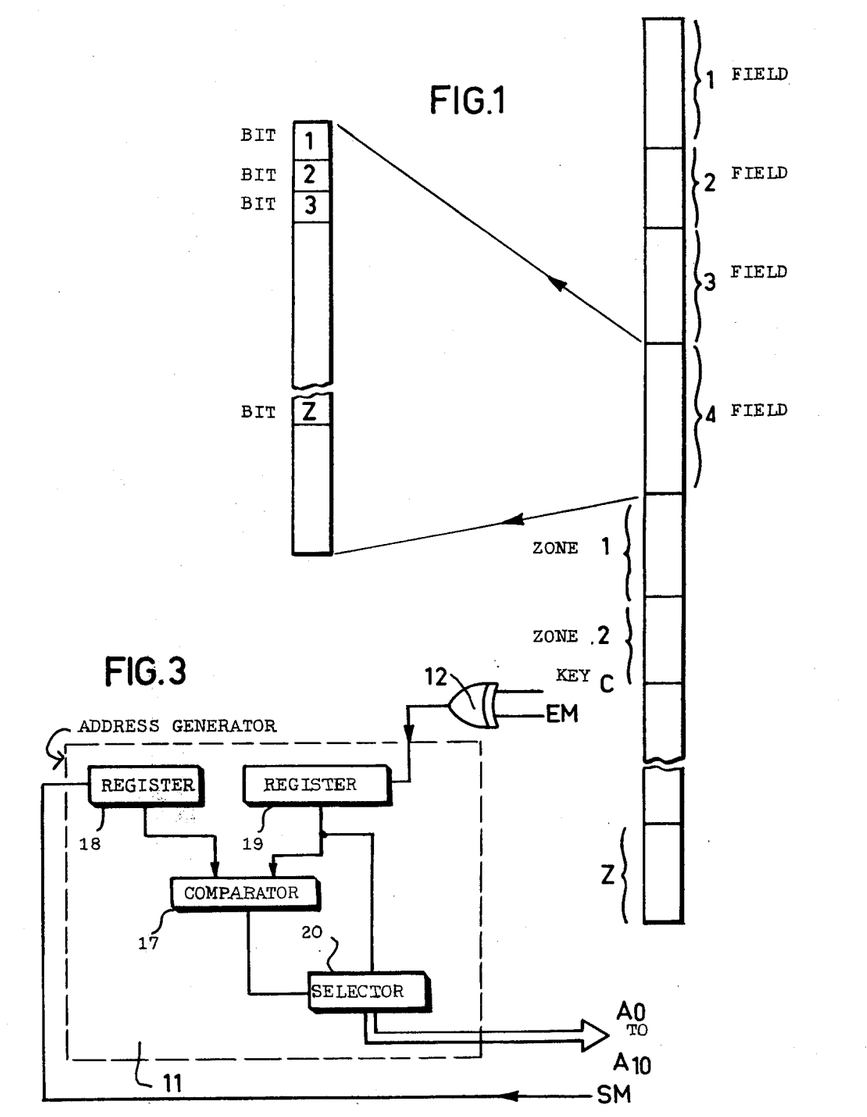
FIG. 1 is a diagram of the organization of the information content of an article according to the invention.
FIG. 3 is a more detailed logic diagram of the address generator of the arrangement of FIG. 2.

FIG. 1 is a diagram of the organization of the information content of an article such as a card according to the invention. This information content is in binary form.

At the head of the card in FIELD 1 an identity code of the card is imprinted which enables the card to be used in suitable operating apparatus. In FIELD 2 a code which enables identification of the value assigned to a unit of credit in relation to a particular type of use is imprinted. In FIELD 3 a service or serial number which enables the card to be identified is imprinted.

The codes in the three FIELDS 1, 2 and 3 are irreversible, that is to say, they are not capable of being manipulated in such a way as to convert a predetermined code which is recognized by an operating apparatus into another code which is also recognized by the apparatus but which is assigned to goods or services of a different kind. To this end, fields of n bits are used for these codes in which the changeover of each bit from one state to the other is irreversible. For more details of coding of this nature, reference may be made to the commonly-assigned French patent application Ser. No. 77 09822, mentioned above, and to corresponding U.S. application Ser. No. 889,517, the entire disclosure of which is hereby incorporated by reference.

A FIELD 4 is for validating a number of zones numbered from 1 to Z. As shown by the enlarged detail, this validating FIELD 4 contains Z bits numbered 1 to Z, each bit corresponding to one of the ZONES 1 to Z. The irreversible changeover to the 1 state of one of the bits in FIELD 4 validates the corresponding ZONE.

Figure 9:
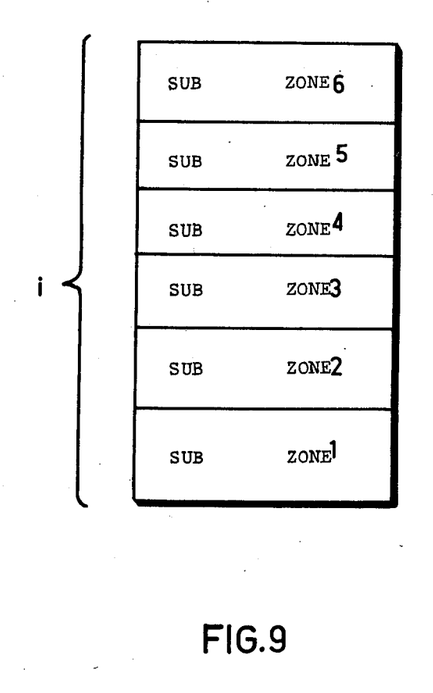
FIG. 9 shows the format of a zone which allows each bit to be assigned a different value.

To make the card more versatile in use, the values of the bits in the various ZONES 1 to Z are not the same. In any particular ZONE, a bit may assume different unit values depending upon its function in the ZONE. As an example, in FIG. 9, a bit in SUB ZONE 1 of exemplary ZONE i may have the value $v$, a bit in SUB ZONE 2 the value of $5v$, a bit in SUB ZONE 3 the value of $10v$, a bit in SUB ZONE 4 the value of $20v$, a bit in SUB ZONE 5 the value $50v$, and a bit in SUB ZONE 6 the value of $100v$. In this example, the bits in SUB ZONES 2 to 6 are allocated to multiples of individual units. However, they may as well be allocated to sub-multiples of individual units.

The function of the validating FIELD 4 is to state to the machine or external device operating on the card which ZONE or ZONES (1 to Z) are to be operated on, the expression "operate on a zone" meaning to change one or more bits of the ZONE in question from 0 to 1 under the control of the operating machine so as to reduce the total credit represented by data stored in the ZONES.

As in the above-mentioned patent application, the bits in the ZONE or ZONES of the memory of the card change from 0 to 1 when the card is operated on, and this change is irreversible.

When the memory ZONE or ZONES have been used up, the card may be reused if authority is given for one or more of the remaining ZONES of the card to be operated on, an authorizing operation being performed by inserting the card in a suitable imprinting or crediting machine.

To prevent any possibility of illicit use, the address of the validating bit in the card is transmitted from the crediting machine to the card in scrambled form. In the crediting device, a key which is identical to that contained in the card is employed. In the crediting machine, the key is found in a memory which is safeguarded by means of the service or serial number in FIELD 3.

Figure 2:
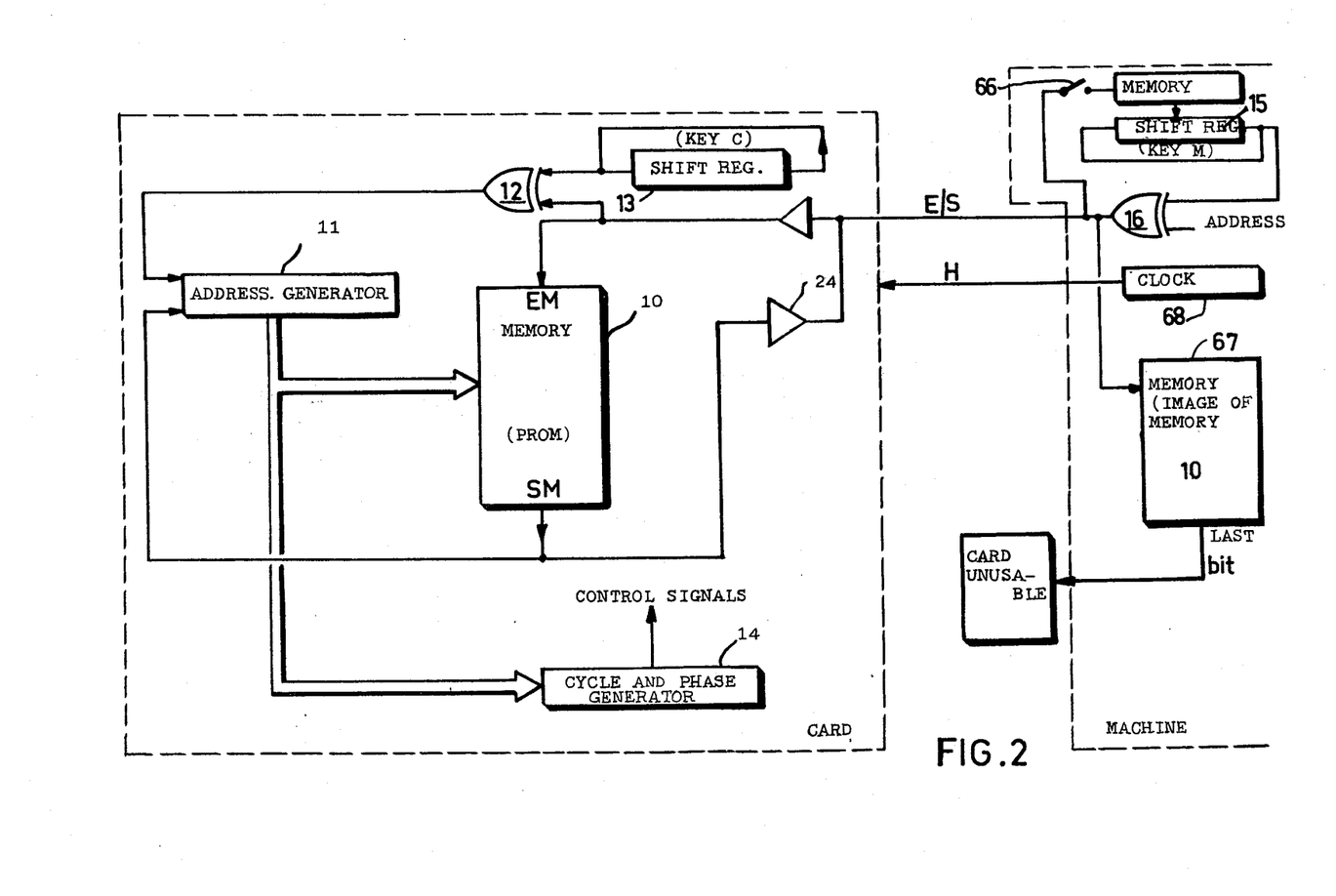
FIG. 2 is a general logic diagram of the circuits carried by the article or card and of a portion of the circuits of the external imprinting and/or operating device or machine.

FIG. 2 is a general logic diagram of the arrangement according to the invention. In the card, the arrangement includes a programmable memory 10 of the PROM type which is addressed by a cyclic address generator 11. The latter receives synchronizing signals H from a clock 68 located in the machine or device for imprinting or operating on the card.

The memory 10 has an input terminal EM and an output terminal SM. Input EM receives a signal from the machine, this signal also being applied to an exclusive OR gate 12, of which a second input is connected to the output of a looped shift register 13 which is responsible for providing a coding KEY C. This key generator is described in greater detail below with particular reference to FIG. 5. The output of the exclusive OR gate 12 is connected to the address generator 11.

The output SM of the memory 10 is connected to the address generator 11 and via an element 24 to the line which connects the card to the machine and which conveys the signals E and S, E being the signal which is transmitted by the card to the machine. A generator 14 for generating cycle and phase signals (control signals) is connected to the address generator 11. The address generator 11 is described in greater detail below with reference to FIGS. 3 and 6.

At the machine end, in addition to the circuits intended to imprint and read from the card, which are not shown but which are identical to those described and illustrated in the above-mentioned U.S. patent application Ser. No. 889,517, there is provided a looped shift register 15 which generates a KEY M in accordance with the information given by the service or serial number in FIELD 3 of the card. This register 15 is connected to an exclusive OR gate 16, the second input of which receives the addresses produced by the machine, and the output of which is connected to the line which conveys signals E and S. The machine also includes a memory 67 which is connected to the E/S line and which stores the data read from the memory 10 of the card at each transaction. The clock signal H required to synchronize the exchanges between the card and the machine is provided by a clock 68.

FIG. 3 is a more detailed diagram of the address generator 11 of FIG. 2. This generator contains a comparator 17 which receives output signals from a register 18 for effective addresses and a register 19 for incident addresses. Register 18 is connected to the output SM of memory 10 and register 19 is connected to the exclusive OR gate 12. The output of comparator 17 is connected to a selector 20 which also receives the output signal from register 19 and which generates addresses $A_0$ to $A_{10}$.

Figure 4:
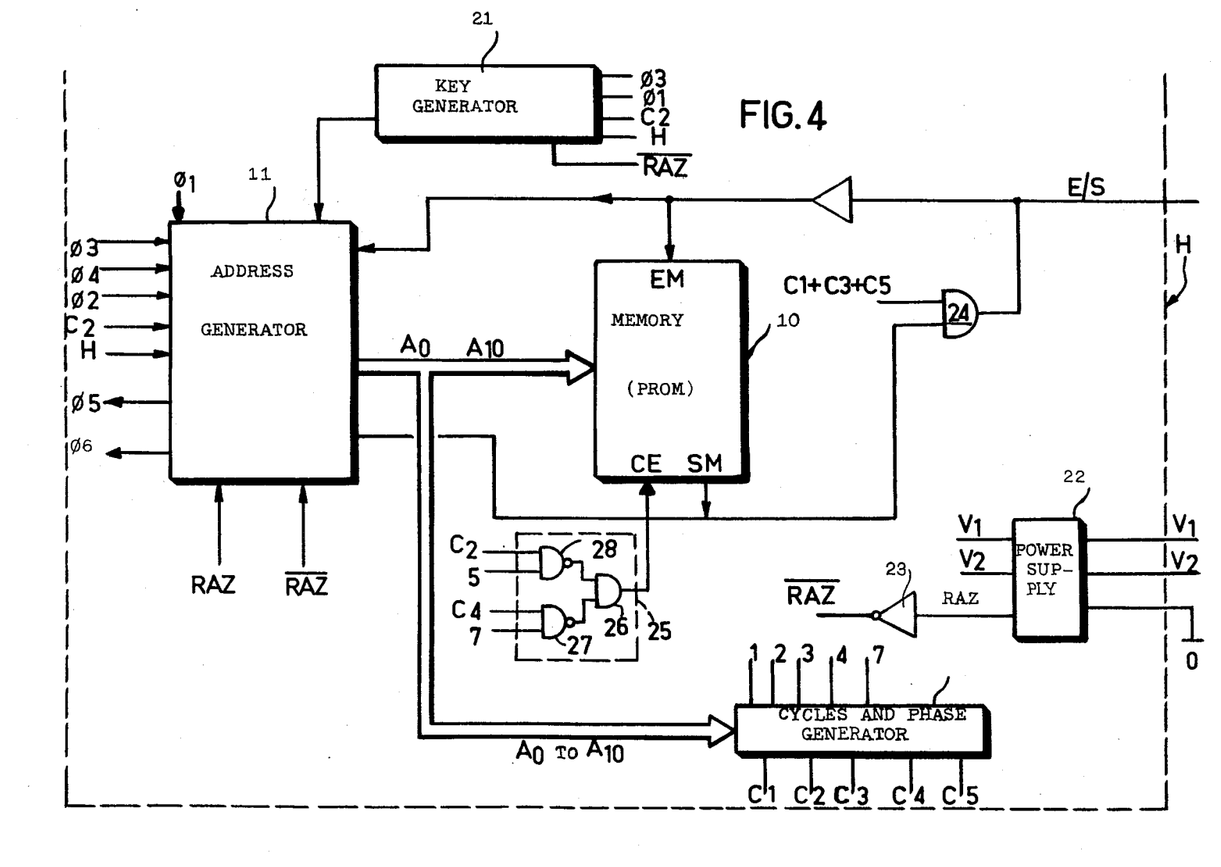
FIG. 4 is a more detailed logic diagram of the circuits of the article of FIG. 2.

FIG. 4 is a more detailed logic diagram of the circuits of the card shown in FIG. 2. At 10 is shown the memory, at 11 the address generator, at 21 the key generator, and at 14 the generator for generating the cycle and phase signals. A power supply 22 supplies the supply voltage V1 for the logic circuits of the card, the voltage V2 for programming the memory 10, and a zero reset signal RAZ which is converted into a signal $\overline{RAZ}$ by an inverter 23.

Figure 6:
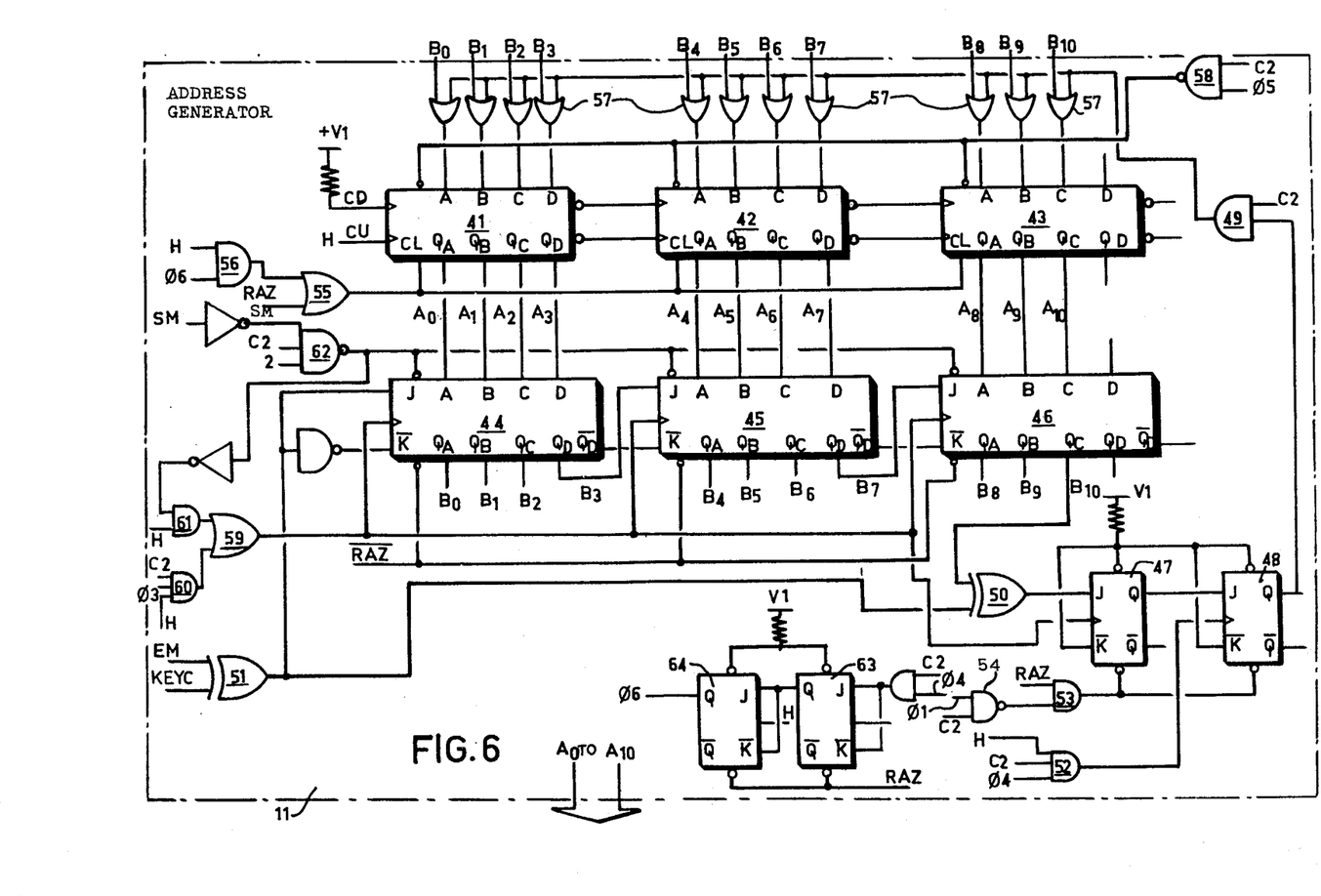
FIG. 6 is a detailed logic diagram of the address generator of the arrangement of FIG. 4.
Figure 7:
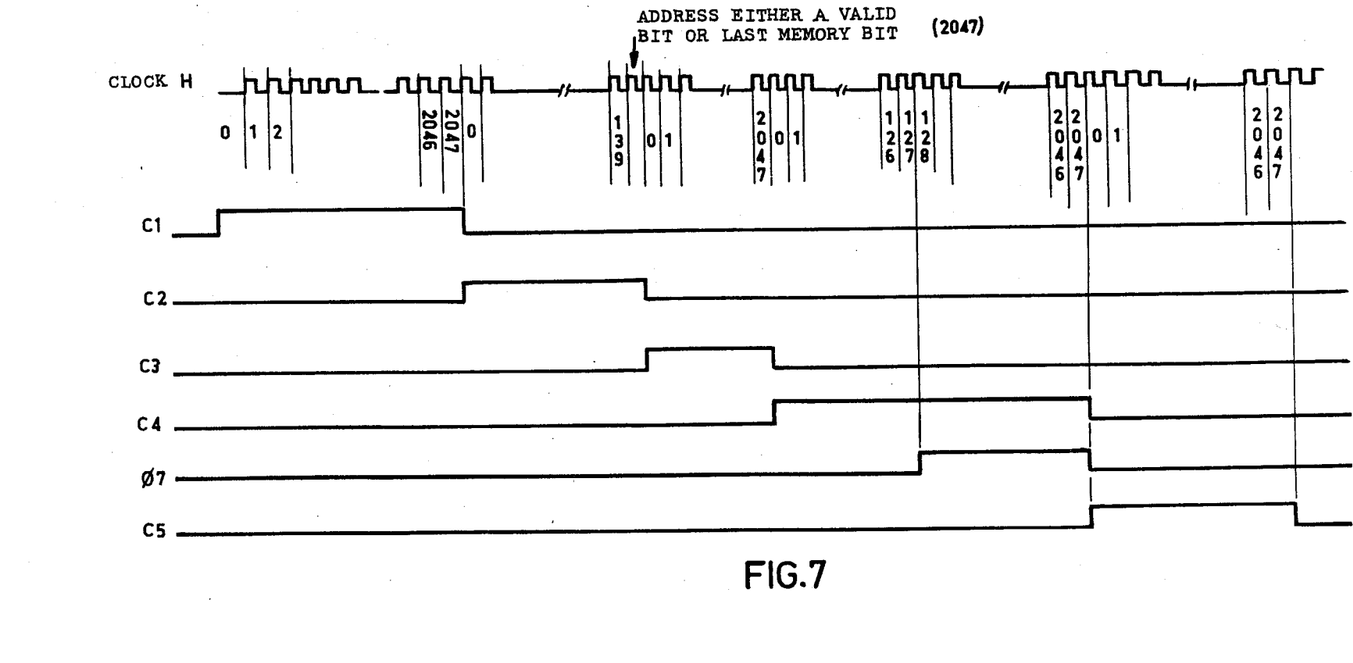
FIGS. 7 and 8 are diagrams of the cycle signals and phase signals, respectively, for writing or reading the information content of the article.
Figure 8:
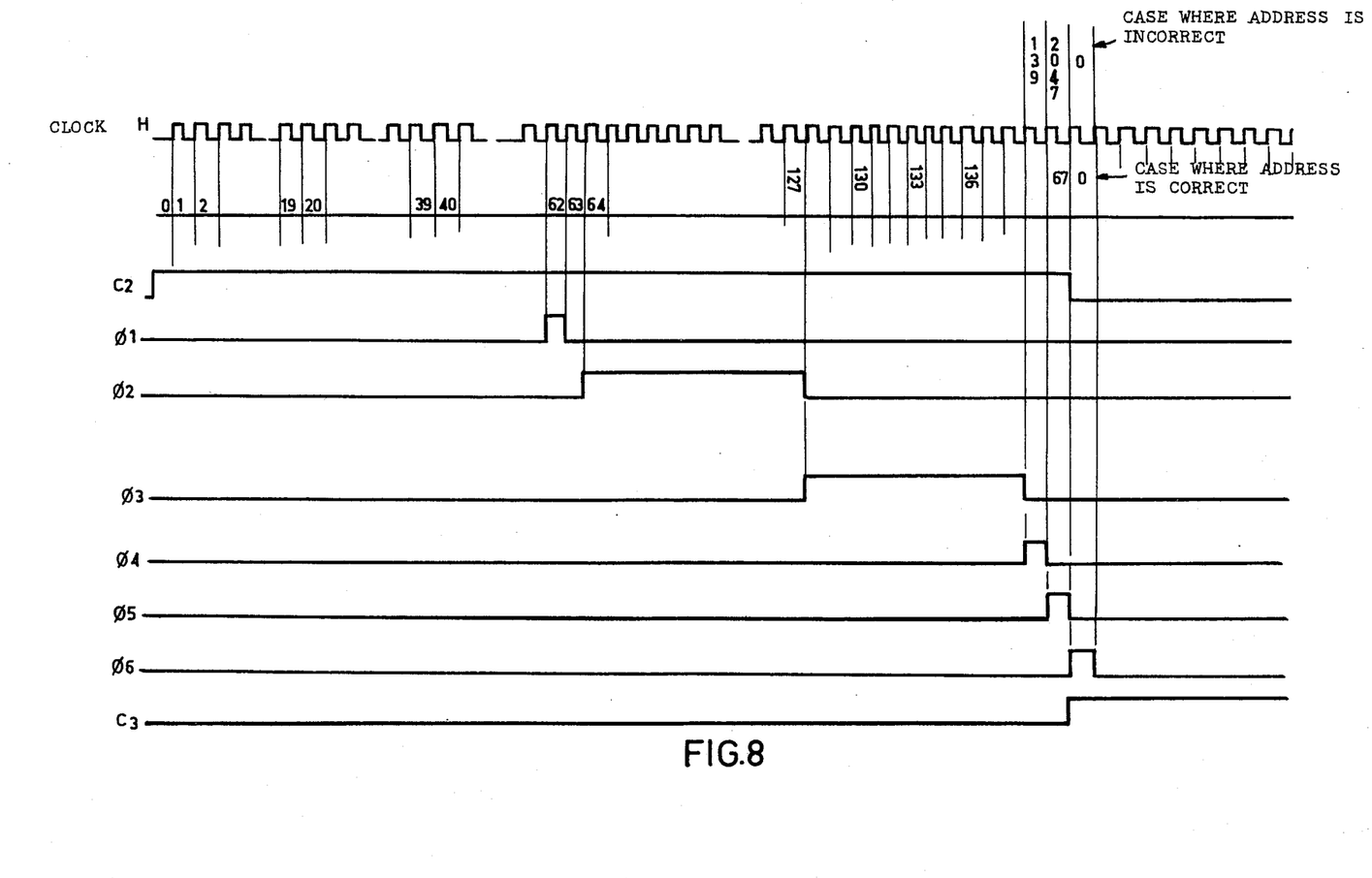

The generator 14 comprises a shift register which provides cycle signals C1 to C5 (FIG. 7) and phase signals $\phi 1$, $\phi 2$, $\phi 3$, $\phi 4$, and $\phi 7$ (FIGS. 7 and 8). The other two phase signals $\phi 5$ and $\phi 6$ are generated by the address generator 11 (FIG. 6).

The output SM of memory 10 is connected through an AND gate 24 to the linking line which conveys signals E and S. The AND gate 24 is enabled by cycle signals C1, C3 and C5.

The memory 10 has a write-control input CE which is connected to a circuit 25 which includes an AND gate 26 and two NAND gates 27 and 28, which receive signals C4, $\phi 7$ and C2, $\phi 5$, respectively.

The key generator 21 receives the signals 1, $\phi 3$, C2, H and $\overline{RAZ}$, and the address generator 11 receives signals $\phi 1$, $\phi 2$, $\phi 3$, $\phi 4$, C2, H RAZ and $\overline{RAZ}$, as well as the signal S from the imprinting and operating machine. In addition to the address bits A0 to A10, the address generator 11 emits the phase signals $\phi 5$ and $\phi 6$.

Figure 5:
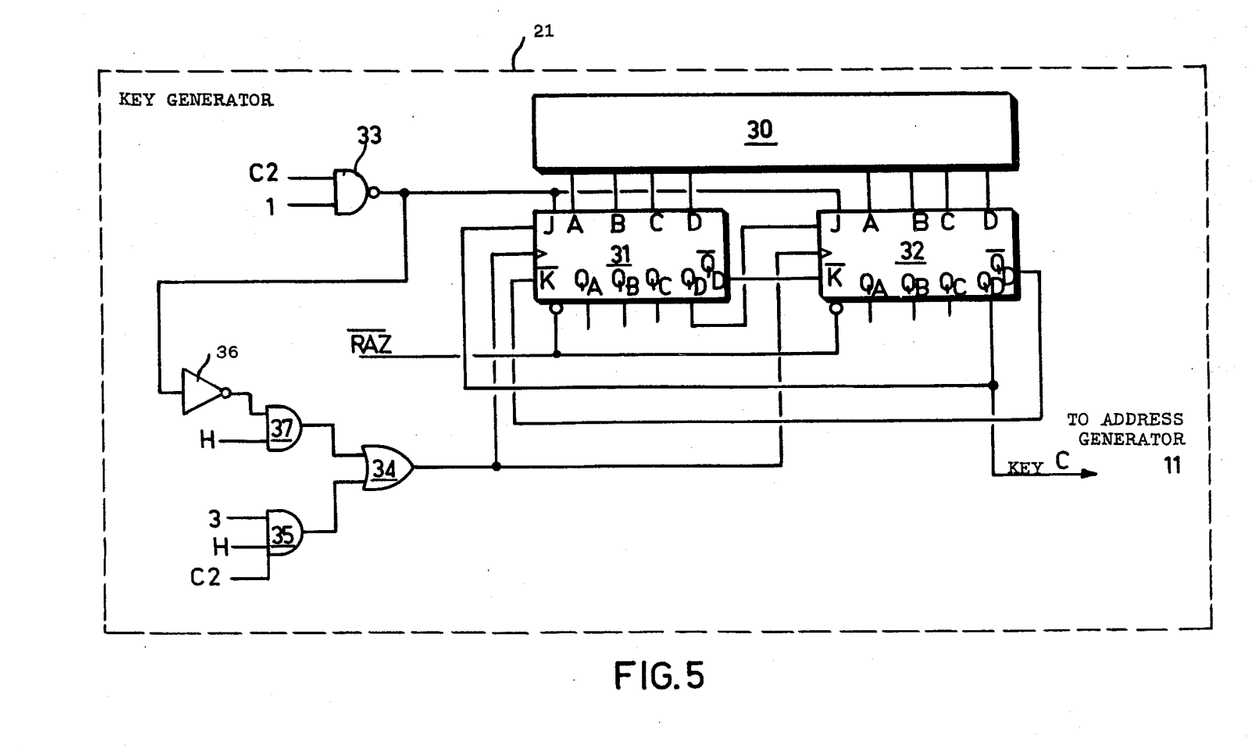
FIG. 5 is a detailed logic diagram of the key generator of the arrangement of FIG. 2.

FIG. 5 is a detailed logic diagram of the key generator 21 of FIG. 4. The generator 21 includes an element 30 which sets the logic state of input terminals A, B, C and D of two shift registers 31 and 32 which determine the key C.

The generator 21 is controlled by NAND gate 33 which receives signals C2 and $\phi 1$, and by an OR gate 34, which receives signals C2, $\phi 3$ and H via an AND gate 35, and the output signal from NAND gate 33 via an inverter 36 and an AND gate 37, which is enabled by clock signal H.

FIG. 6 is a detailed logic diagram of the address generator 11 of FIGS. 2, 3 and 4. This generator 11 includes a counter formed by registers 41, 42 and 43. The counter generates the addresses A0 to A10.

Elements 44, 45 and 46 are registers for, on the one hand, receiving the effective address of the bit to be validated, and, on the other hand, receiving the incident address. The comparator 17 of FIG. 3 is represented in FIG. 6 by two bistable flip-flops 47 and 48, which control the counters 41, 42 and 43 via an AND gate 49 which is enabled by signal C2. Flip-flop 47 is controlled by an exclusive OR gate 50 which is connected to the output of the register 46 and to the output of another exclusive OR gate 51 which receives the signal applied to input EM of memory 10 and which is enabled by the signal KEY C.

The output signal from exclusive OR gate 51 also controls registers 44 to 46.

Flip-flop 48 is controlled by an AND gate 52 which is activated by signals H, C2 and $\phi 4$. Flip-flops 47 and 48 are reset to zero by an AND gate 53 which is activated by zero reset signal RAZ and the output signal from an AND gate 54 which is activated by signals $\phi 1$ and C2.

Registers 44 to 46 are reset to zero by signal $\overline{RAZ}$ and the counting registers 41 to 43 are reset to zero by an OR gate 55 which is activated either by signal RAZ or by the output signal from AND gate 56 which is activated by signals H and $\phi 6$.

The command to transfer the contents of registers 44 to 46 to the counting registers 41 to 43 is given by means of a series of OR gates 57 which are enabled by AND gate 49 and under the control of a NAND gate 58 which is activated by signals C2 and $\phi 5$.

The progress of the bits through registers 44 to 46 is controlled or clocked by an OR gate 59, which is activated either by signals C2, $\phi 3$ and H, via an AND gate 60, or by the output signal from an AND gate 61. The AND gate 61 is activated by clock signal H and the output signal (inverted) from a NAND gate 62 which is activated by signals C2, $\phi 2$ and SM.

The output of NAND gate 62 also loads registers 44 to 46.

Finally, the address generator 11 generates the phase signals $\phi 5$ and $\phi 6$ by means of two bistable flip-flops 63 and 64 under the control of signals C2 and $\phi 4$.

FIG. 7 shows the cycle signals C1 to C5, and the phase signal $\phi 7$. FIG. 8 shows the phase signals $\phi 1$ to $\phi 6$ during cycle C2 of FIG. 7. The clock signal H in FIGS. 7 and 8 is supplied by the external device or machine.

The way in which the illustrated arrangements operate is as follows. Operation is described for both writing to a card (imprinting credit in the memory of the card) and operating on the card (making debits in the memory). Operations take place in five cycles C1 to C5.

Cycle C1 is a cycle of reading the memory 10 of the card. During cycle C1, the entire memory 10, including the unvalidated ZONES, is read and an image thereof stored in memory 67.

Cycle C2 is for writing into the validating FIELD 4 (the FIELD for validating ZONES 1 to Z). When it is desired to enter credit into one or more ZONES of the memory of the card, one or more bits 0 state to the 1 state. For example, if it is desired to use ZONES 1, 2, 3 and 4, the imprinting machine or device causes the first four bits of FIELD 4 to change to 1.

If, on the other hand, the card is to be debited, the operating machine will cause bits corresponding to the amount to be debited to change from 0 to 1 in the available memory ZONE or ZONES.

The address of the bit to be written is emitted by the key generator 15 (FIG. 2) of the imprinting or operating machine. This address is not emitted in clear, but in scrambled, form.

At the card (FIG. 3), the address is deciphered by the exclusive OR gate 12 and compared in comparator 17 with the effective address of the bit to be written (stored in register 18). If the two addresses are the same, the bit is imprinted, while if they are different a predetermined bit of the memory is imprinted. Preferably, the predetermined memory bit is the last bit of the memory 10. The imprinting of the last bit of the memory will subsequently be detected by the operating machine to cause the card to be rejected.

Cycle C3 is a reading cycle identical to cycle C1.

Cycle C4 is a writing cycle during which FIELDS 1, 2, 3 and 4 are shielded, only ZONES 1 to Z being accessible.

Finally, cycle C5 is a reading cycle identical to cycle C1.

The operation of writing a certain credit into the card will now be described in detail.

Once the card has been placed in position and the connections made, cycle C1 begins with the appearance of clock signal H (FIG. 7). It covers a complete cycle (2048 bits) of addressing the memory 10 of the card. Thus, the card is read.

All the read data is transmitted (signal E) to the crediting machine. If any anomaly is detected, such as the last memory bit being imprinted, the card is rejected.

It will be assumed that the card has already been used, that is to say, its FIELDS 1, 2 and 3 have already been written in, and that it is to be "replenished."

At the end of cycle C1, signal C2 appears (FIGS. 7 and 8). C2 is a short cycle of 141 periods of the clock signal H for writing in the validating FIELD 4 of the memory of the card.

This writing operation is possible because the external machine knows the serial number stored in FIELD 3, which the card passed on to it in the course of cycle C1. This serial number gives the KEY to be used.

The object of the incident signal is to communicate to the card, after comparison with the signal from key generator 21, the address of the next validating bit to be imprinted in the validating FIELD 4.

When signal $\phi 2$ appears, validating FIELD 4 is read. When the first zero bit is detected in FIELD 4, this causes the address of this bit to be loaded into registers 44 to 46.

During phase φ3 of cycle C2, the card receives the address of the validating bit to be set to 1, reception taking place with the most significant bit first.

If no difference is detected in phase φ3, flip-flop 47 remains in the 0 state. If a difference is detected, flip-flop 47 changes to the 1 state.

In phase φ4, if flip-flop 47 is at 0, flip-flop 48 remains in the 0 state. If flip-flop 47 is in the 1 state, flip-flop 48 likewise goes to the 1 state. During φ3, the content of registers 31 and 32 is shifted in a loop eleven times. This looped shift generates the KEY C which will be transmitted to the address generator 11.

During phase φ5, if flip-flop 48 is in the 0 state, the content of registers 44 to 46 is passed on to counters 41 to 43. If flip-flop 48 is in the 1 state, the counter 41 to 43 is loaded with eleven 1 bits.

During phase φ6, the counter 41 to 43 is reset to zero.

If in the course of phase φ3 the comparison between the actual address of the bit to be written to and the address supplied by the machine reveals a difference, the last bit of the memory is set to 1 during phase φ5. This is shown at the top of FIG. 8 where the clock signals H and the memory addresses appear. In a case where the addressing is correct, it is, for example, the 67th bit of the validating FIELD 4 of the memory which will be addressed. In the event of incorrect addressing, it is the 2047th bit of FIELD 4 which will be addressed.

Thus, if the 2047th bit is addressed, this indicates an attempt at illicit use which will easily be detected by the operating machine.

Since the probability of an illicit user (who does not know the KEY C) setting a validating bit correctly is equal to 1/2048, the system is very secure against illicit use.

The end of cycle C2 initiates cycle C3 which is a reading cycle.

In the course of cycle C4, FIELDS 1, 2, 3 and 4 of the card are shielded and only ZONES 1 to Z are accessible when phase φ7 begins. At this moment, the bits of the ZONES concerned are set to 1.

When all the memory of the card has been addressed at the end of cycle C4, cycle C5 begins, this being a reading cycle.

Once the whole of the memory has been read the cycle of operations comes to an end.

It is possible in this way for the crediting machine to record the serial number in FIELDS 3 of cards credited, this possibility enabling certain dubious cards to be checked. To this end, it contains a non-volatile or permanent memory 65 (FIG. 2) to which the operator can gain access at 66 by means of a synchronized identity code. When addressed by the serial number of a card, this memory 65 supplies the KEY register 15 of the crediting machine with the KEY to be used.

The card, once duly credited, may be used in any suitable operating machine.

After the card has been inserted and the connections made, the same cycles C1 to C5 take place as are used in the case of the crediting machine.

The operating machine is responsible for debiting the card, that is to say, for setting to 1 the bits corresponding to the amount to be debited in the ZONE or ZONES to be operated on.

During cycle C1, memory of the card is read.

During cycle C2, the machine calls for 0's to be imprinted in the validating FIELD 4 of the memory of the card at the appropriate bit addresses, rather than 1's as in the case of crediting. This imprinting request has no effect on the memory since the bits which are already in an irreversible 1 state and the bits which are already at 0 are able to remain in these states. The addresses transmitted by the machine may thus be as desired.

Cycle C3 is a reading cycle identical to cycle C1.

In the course of cycle C4, which is a writing cycle, FIELDS 1, 2, 3 and 4 are shielded and only the ZONES and SUB ZONES authorized by the validating FIELD 4 are accessible to the debiting machine, which then imprints 1's.

Finally, cycle C5 is a reading cycle identical to cycle C1.

In cases where there has been an attempt at illicit use, the last bit of the memory of the card will have been set to 1. When such a card is inserted in a debiting machine, at the first reading cycle C1 the last bit of the card memory is detected to be at 1 in memory 67, and the card is rejected.

It will be understood that the example which has just been given of an embodiment of the invention is in no sense limiting, and that those skilled in the art could arrive at modified embodiments without exceeding the scope of the invention, which is set forth in the appended claims.

What is claimed is:

1. A system for keeping account of predetermined homogeneous units, which comprises:
    an information-carrying article including a memory for storing information and circuits for controlling said memory;
    an external device for operating on information stored in said article memory; and
    means for coupling said article and said external device for the exchange of data;
    said article memory including a validating field accessible by said external device, said validating field having a plurality of information bits, and said article memory further including a plurality of zones corresponding to said information bits of said validating field, each of said information bits indicating whether the corresponding zone is validated.

2. A system according to claim 1, wherein in each of said zones there is stored information indicating the number of units available, and wherein available units in a validated zone may be withdrawn by said external device.

3. A system according to claim 1, wherein access to said validating field is gained by means of a predetermined key embodied in said article, said key being accessible by said external device.

4. A system according to claim 3, wherein said key embodied in said article is in coded form.

5. A system according to claim 1, 2, 3 or 4, wherein bit changes in said article memory are irreversible.

6. A system according to claim 2, wherein at least one of said zones comprises a plurality of sub-zones, at least one of said sub-zones being allocated to multiples of individual units.

7. A system according to claim 2, wherein at least one of said zones comprises a plurality of sub-zones, at least one of said sub-zones being allocated to sub-multiples of individual units.

8. A system according to claim 4, wherein said article includes an address generator for addressing said memory and a key generator, said address generator receiving information both from said external device and from said article key generator; and said external device also includes a key generator capable of reconstituting the article key for coding information intended for said article.

9. A system according to claim 8, wherein said address generator includes:

an incident address register connected to receive information from said article key generator;

an effective address register connected to the output of said memory;

a comparator connected to the outputs of said registers; and a selector for connecting the output of said incident address register to the addressing inputs of said memory in response to a signal from said comparator.

10. A system according to claim 8 or 9, wherein said address generator addresses a predetermined location of said memory when the effective address and the address received from said external device do not agree.

11. A system according to claim 10, wherein said predetermined location of said memory is the last bit of said memory.

12. A system according to claim 3, wherein said external device includes a memory for storing keys of a plurality of articles.

13. A system according to claim 2 or 4, wherein said external device is capable of changing a bit in said validating field to indicate that the corresponding zone is validated.

14. A system according to claim 2 or 4, wherein said external device is capable of changing a bit in a validated zone to indicate that a unit is withdrawn.

15. A system according to claim 14, wherein said external device is capable of changing a bit in said validating field to indicate that the corresponding zone is validated.

16. A system according to claim 13, wherein bit changes in said article memory are irreversible.

17. A system according to claim 14, wherein bit changes in said article memory are irreversible.

18. A system according to claim 14, wherein bit changes in said article memory are irreversible.

* * * * *